United States Patent [19]

Baker et al.

[11] 4,156,885
[45] May 29, 1979

[54] AUTOMATIC CURRENT OVERLOAD PROTECTION CIRCUIT FOR ELECTROSTATIC PRECIPITATOR POWER SUPPLIES

[75] Inventors: Forester C. Baker, Ft. Thomas, Ky.; Wendell P. Spurgin, Cincinnati, Ohio

[73] Assignee: United Air Specialists Inc., Cincinnati, Ohio

[21] Appl. No.: 823,583

[22] Filed: Aug. 11, 1977

[51] Int. Cl.$^2$ .............................................. H02H 3/08
[52] U.S. Cl. ..................................... 361/100; 361/92; 361/94
[58] Field of Search .................. 361/100, 93, 94, 91, 361/92, 88, 235, 35, 175; 55/105, 101, 106, 110; 323/20, 21, 22 T, 44 R, 48, 57, 89 P; 363/19, 50

[56] References Cited

U.S. PATENT DOCUMENTS

| | | | |
|---|---|---|---|
| 3,188,784 | 6/1965 | Nodolf | 55/105 |
| 3,648,437 | 3/1972 | Bridges | 55/105 |
| 3,699,424 | 10/1972 | Hart et al. | 363/50 X |
| 3,733,538 | 5/1973 | Kernick et al. | 361/93 X |
| 3,914,685 | 10/1975 | Van Gilder | 323/20 |
| 4,005,344 | 1/1977 | Gaind et al. | 361/92 |

Primary Examiner—Patrick R. Salce
Attorney, Agent, or Firm—Melville, Strasser, Foster & Hoffman

[57] ABSTRACT

An automatic current overload protection circuit for electrostatic precipitator power supplies of the type utilizing a ferroresonant transformer. A low voltage tertiary winding in association with the transformer provides an output voltage to a sensing circuit for inhibiting current flow into the primary of the transformer when the tertiary voltage falls below a predetermined threshold. Another output voltage developed in association with the high voltage secondary winding of the transformer is also utilized to independently inhibit current flow into the primary of the transformer when the secondary voltage falls below a predetermined threshold. A time delay may be provided to permit operation of the overload protection circuit only in the event of a sustained overload current condition.

9 Claims, 5 Drawing Figures

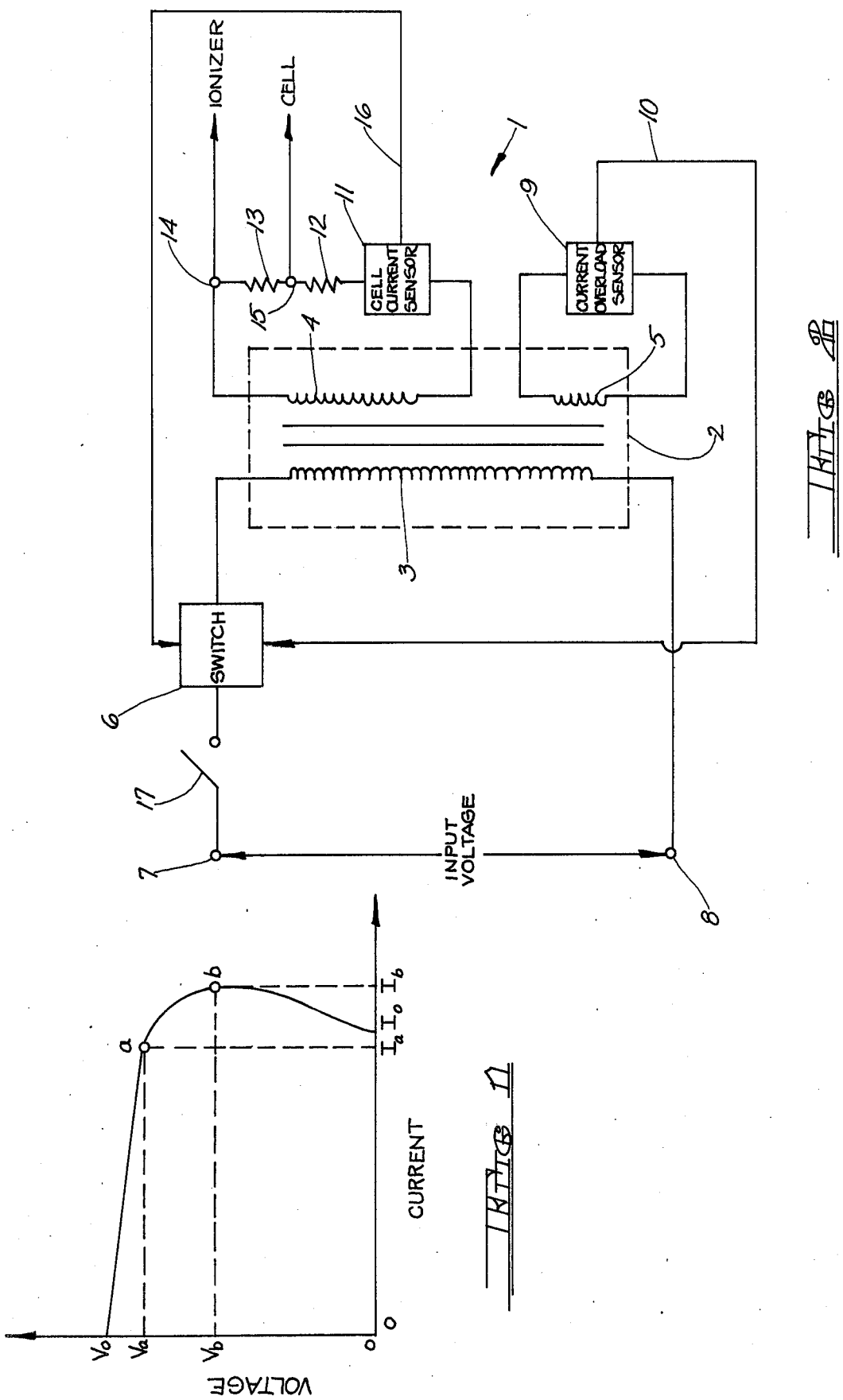

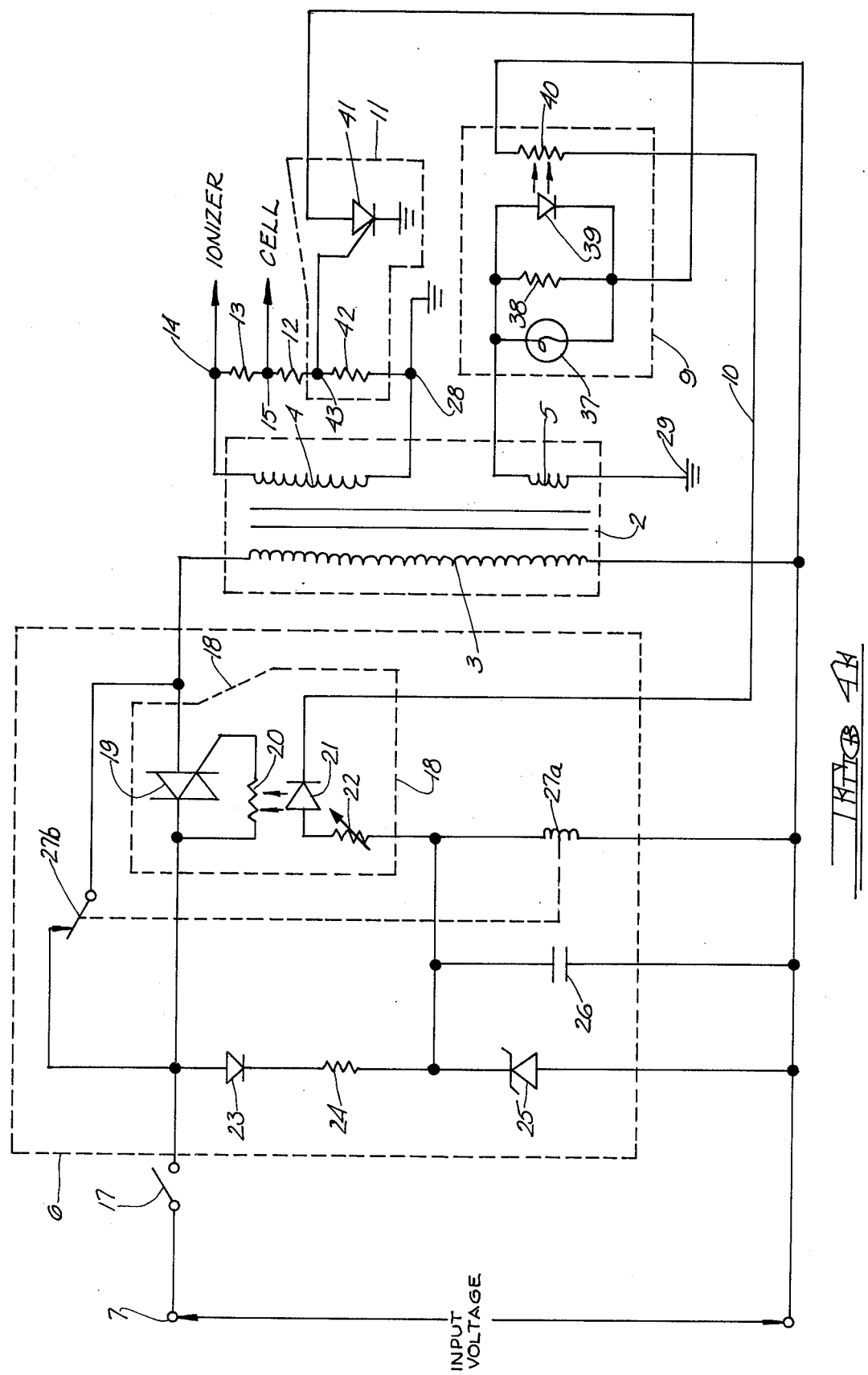

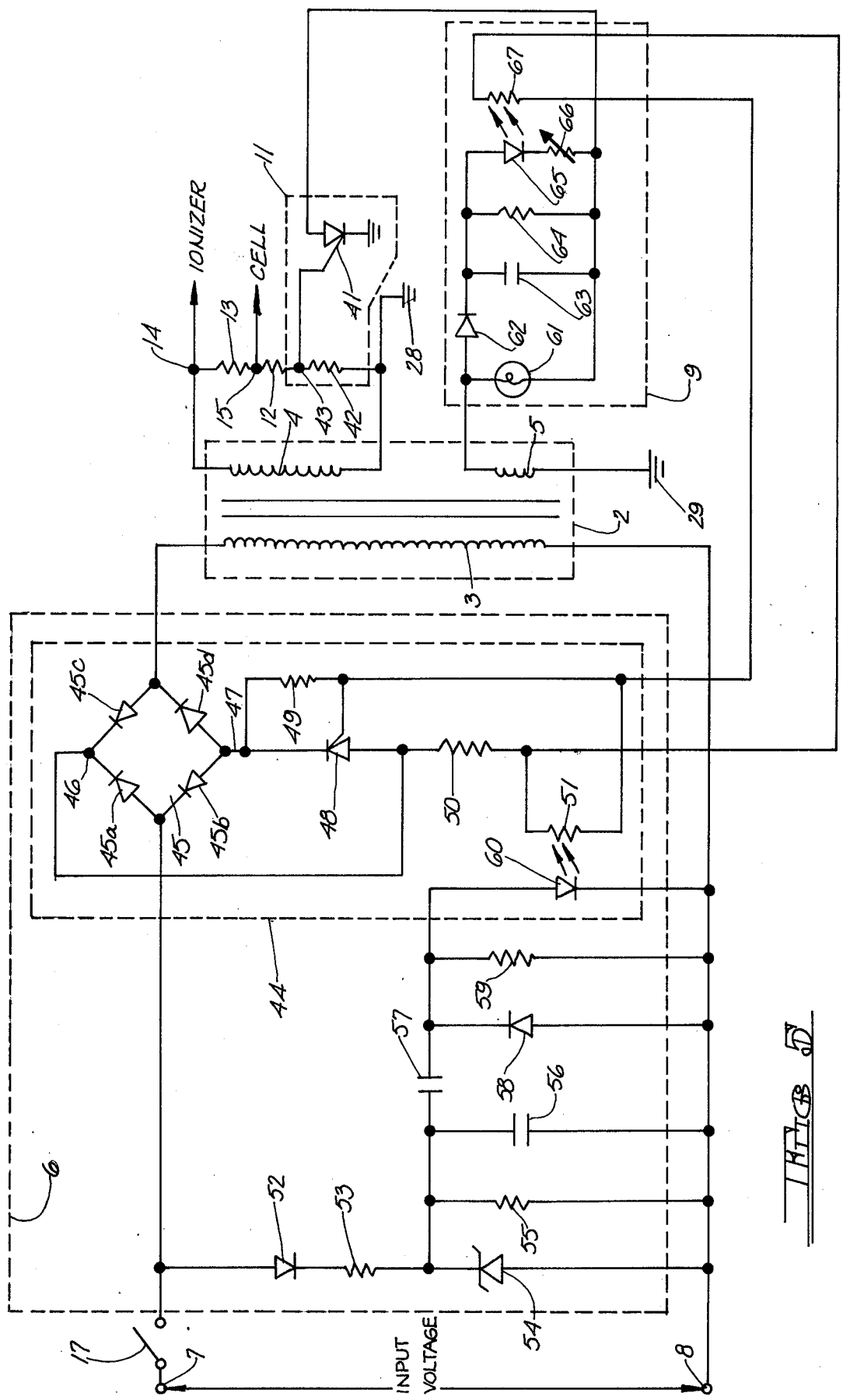

AUTOMATIC CURRENT OVERLOAD PROTECTION CIRCUIT FOR ELECTROSTATIC PRECIPITATOR POWER SUPPLIES

BACKGROUND OF THE INVENTION

1. Field of the Invention

The present invention relates generally to circuits for protecting power supplies from damage by current overloads, and more particularly to a circuit for protecting electrostatic precipitator power supplies utilizing ferroresonant transformers from damage caused by current overloads.

2. Background of the Invention

The use of electrostatic precipitators to remove particulate matter from an airstream is well known in the art. Typically, an ionizer is utilized to produce an electrostatic field to charge the contaminating particles. The charged particles may then be captured by a collecting cell comprised of charged and grounded plates to accumulate the charged particles or contaminants.

In order to achieve efficient operation of electrostatic precipitators of the type described, it is well known that relatively high voltage levels must be maintained on both the ionizer and collecting cells. As contaminants are accumulated by the precipitator collecting cells, it is not uncommon for intermittent arcing, which may progress to an essentially continuous or short circuit condition, to occur between the highly charged potential surfaces and ground within the collecting cell. Arcing of this type may result in unnecessarily high overload currents required of the precipitator power supply, which can damage electronic components and result in inefficient precipitator operation. For example, overload currents caused by collecting cell arcing may produce cell voltages less than that required to trap charged particles, resulting in large numbers of the charged particles being exhausted into the area to be treated. These problems have been found to be particularly acute in industrial operations where higher operating voltages and larger contaminate accumulations of varying conductivity result in more frequent arcing between precipitator components.

Several methods have been proposed to eliminate hazards caused by current overloads in electrostatic precipitator power supplies. For example, circuit breakers have been employed to disable the power supply when the primary current supplied to the precipitator exceeds a predetermined value. However, such circuit breakers can present a shock hazard since large currents may exist before the circuit breaker trips to disable the power supply. In addition, for precipitator arcing conditions less than a direct short, or in cases where the arcing condition is intermittent, the primary current level necessary to trip the circuit breaker may not be reached. Circuit breakers are also known to be subject to mechanical wear and, in general, are not adjustable to provide for variations in trip current.

Ferroresonant transformers have also been suggested to inhibit electrostatic precipitator power supply operation in the presence of overload current conditions. The output voltage of such transformers generally remains constant or decreases slightly with increasing current, until a critical point of ferroresonance is reached, whereupon the output voltage begins to decrease rapidly with small increases in output current. Once the critical point or "knee" has been reached, the output voltage of the transformer may continue to decrease even though the output current also decreases, producing the characteristic ferroresonant transformer foldback effect. Power supplies relying only on the voltage regulating characteristics of the ferroresonant transformer have not successfully dealt with protecting the power supply against current overloads, since such transformers fail to provide protection in the upper current ranges, particularly after the knee of the transformer voltage-current characteristic curve has been exceeded and transformer operation is continuing in the foldback region.

SUMMARY OF THE INVENTION

The protection circuit of the present invention, when used in conjunction with electrostatic precipitator power supplies of the type utilizing a ferroresonant transformer, overcomes the disadvantages of prior art protection schemes to inhibit power supply operation in the event of undesirable current overloads.

The protection circuit comprises a tertiary winding in association with the ferroresonant transformer which provides an output voltage varying with the amount of current supplied by the ferroresonant transformer to the electrostatic precipitator collecting cell and ionizer. When the current being supplied by the transformer causes the tertiary output voltage to fall below a predetermined level, a sensing circuit in association with the tertiary winding provides a signal to a switch located in series with the primary of the transformer to inhibit current flow into the primary of the transformer, thereby disabling the power supply until the condition causing the current overload can be corrected. In addition, indicating means in association with the sensing circuit may be used to provide a visual indication of the status of the protection circuit. A time delay feature may also be incorporated in the overload current sensor so that current is inhibited through the primary winding of the transformer only in the case of a sustained overload current condition.

An independent sensing circuit in association with the high voltage collector cell and ionizer output may also be employed to provide an inhibiting signal to the switch located in the primary circuit of the power supply when excessive current is being supplied to the collector cell, or ionizer, thereby indicating an arcing or shorted condition.

BRIEF DESCRIPTION OF THE DRAWING

FIG. 1 is a graphical representation of the voltage-current characteristics of a typical ferroresonant transformer, such as that employed in connection with the circuit of the present invention.

FIG. 2 is a schematic block diagram of the protection circuit of the present invention.

FIG. 4 is a schematic representation of a second embodiment of the protection circuit of the present invention.

FIG. 5 is a schematic representation of a third embodiment of the protection circuit of the present invention.

DESCRIPTION OF THE PREFERRED EMBODIMENTS

Figure 3:
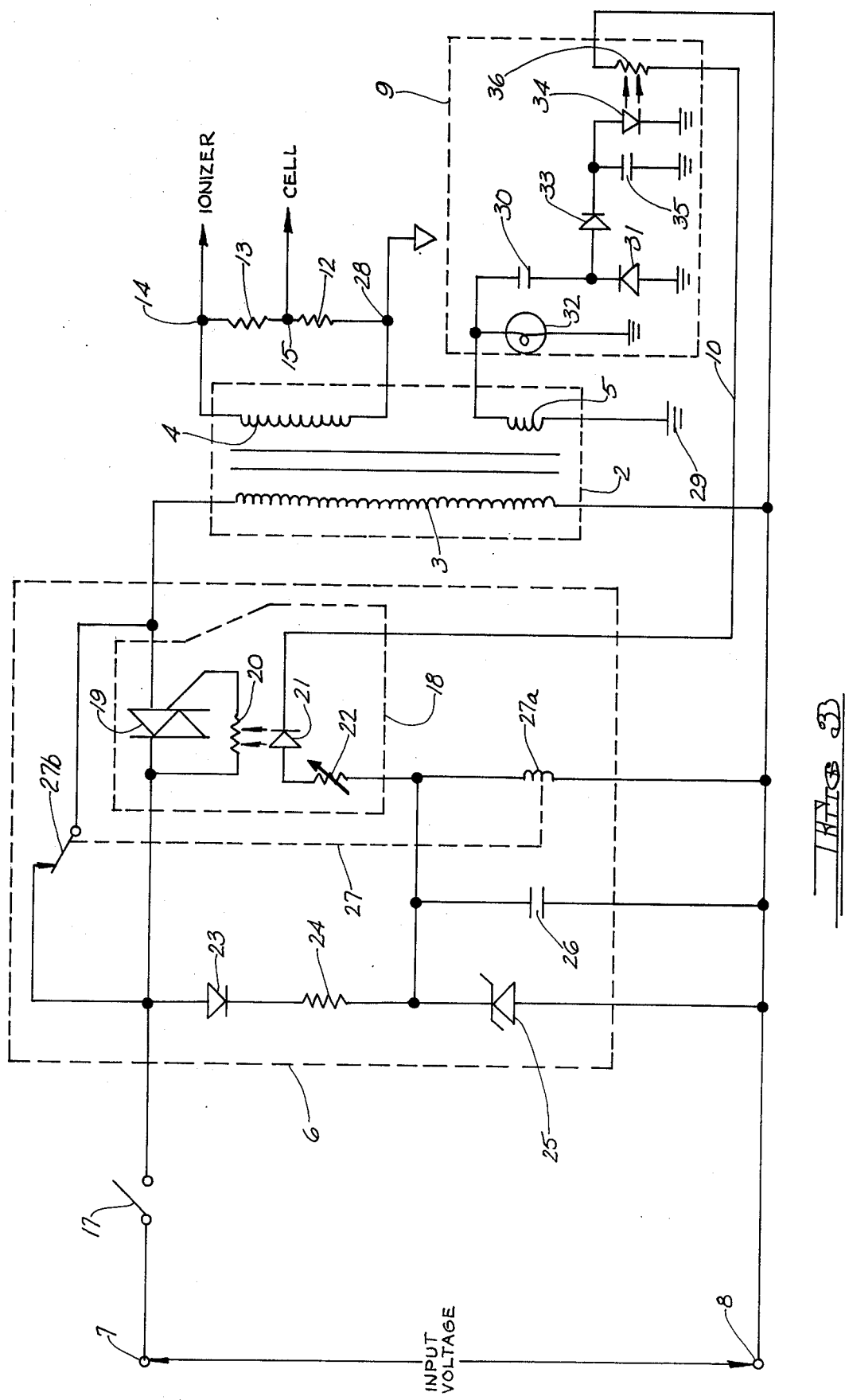
FIG. 3 is a schematic diagram of a first embodiment of the protection circuit of the present invention.

The protection circuit of the present invention is designed primarily for use in electrostatic precipitator power supplies of the type utilizing a ferroresonant transformer. The operation of such a transformer is well known in the art, and need be only briefly described herein. FIG. 1 represents graphically the voltage-current characteristic of a typical ferroresonant transformer, such as that used with the electrostatic precipitator power supply presently under discussion. As is typical with this type of transformer, the output voltage assumes a no-load value of $V_0$ decreasing to a value of $V_a$ as the output current is increased to a value of $I_a$. The condition ($V_a$, $I_a$) shown at point a in FIG. 1 represents the beginning of the so-called "knee" portion of the characteristic curve of the ferroresonant transformer. As the transformer attempts to supply more current, such as might occur during a short or arcing condition of the electrostatic precipitator, the output voltage rapidly decreases to a value $V_b$ for an output current $I_b$ occurring at point b in FIG. 1, representing the maximum output current available from the particular ferroresonant transformer. As the load to the transformer is further increased, both voltage and current decrease, forming what is known as the "foldback" region of the characteristic curve, eventually terminating in the short-circuit current $I_o$. It will be understood that the typical characteristics shown in FIG. 1 may vary from specific types of ferroresonant transformers. For example, in some cases it may be found that the short circuit current $I_o$ is actually less than $I_a$.

This unique behavior of ferroresonant transformer output voltage with current forms the basis for the overload protection circuit of the present invention, shown generally at 1 in the block diagram of FIG. 2. The ferroresonant transformer used in association with the power supply is shown at 2, and includes a primary winding 3, a secondary winding 4 and a tertiary winding 5. A switch 6, which may be either electronic or electrochemical, is placed in series with primary winding 3 of transformer 2 to interrupt the flow of current through primary winding 3. Under normal operating conditions, switch 6 will be closed, permitting current flow through primary winding 3 for inducing voltages in secondary winding 4 and tertiary winding 5. When the switch 6 is opened, in response to a current overload condition as will be explained hereinafter, current flow through primary winding 3 is interrupted, thereby causing the voltages induced in secondary winding 4 and tertiary winding 5 to drop to zero, disabling the power supply. When the condition causing the overload has been removed, switch 6 may be reset to reestablish current flow through primary winding 3. The input voltage to power supply, which may consist of 105-125 VAC 60 hZ power, is applied to input terminal 7 connected to one pole of switch 6 through switch 17, and terminal 8, connected to primary winding 3.

Current overload sensor 9 is connected across tertiary winding 5 to sense the voltage induced in tertiary winding 5. When this voltage drops below a predetermined threshold level, indicating that an overload current is being supplied by transformer 2, an inhibit signal will be produced by current overload sensor 9 on line 10 to switch 6 to inhibit current flow through primary winding 3 and disable the power supply. In order to insure that the power supply is not disabled for every intermittent arcing condition that may occur, a time delay feature may be incorporated in sensor 9 to produce an inhibit signal to switch 6 only in the event of a sustained overload current condition.

Cell current sensor 11 is connected in series with resistors 12 and 13 across secondary winding 4. The full secondary output voltage appearing at node 14 is supplied to the ionizer of the electrostatic precipitator. The voltage appearing at node 15, which forms the junction between resistors 12 and 13 and is approximately one-half the value of the voltage supplied to the ionizer, is supplied to the collecting cell. Cell current sensor 11 monitors the current through resistor 12, and will produce a signal on line 16 to inhibit switch 6 whenever excessive current is being required by the collecting cell. With switch 6 inhibited, current flow through primary winding 3 is interrupted to disable the power supply.

Once the condition causing the current overload has been corrected, the protection circuit 1 may be reset by momentarily interrupting the input voltage supply to switch 6, such as by opening and closing power switch 17 placed between terminal 7 and switch 6.

Turning to FIG. 3, wherein like elements are given like index numerals, a first embodiment of the protection circuit of the present invention is illustrated schematically. Switch 6 includes solid state relay 18 connected in series with primary winding 3 of transformer 2. It will be understood that solid state relay 18 may comprise other types of relays, as well as electronic, or electromechanical switches. For purposes of an exemplary showing, solid state relay 18 includes a triac 19 connected in series with primary winding 3 of transformer 2. A light sensitive resistor 20 is connected between the input and gate electrode of triac 19, and is optically coupled to light emitting element 21. Resistor 22 placed in series with light emitting element 21 may be used to control the sensitivity of solid state relay 18, as will be described hereinafter.

A diode 23, resistor 24, and zener diode 25 are connected in series between the input to solid state relay 18 and input voltage terminal 8, with the anode of diode 23 connected to the input of solid state relay 18, and the anode of zener diode 25 connected to terminal 8. A capacitor 26 is connected across zener diode 25 and the free end of sensitivity adjustment resistor 22 connected to the cathode of zener diode 25. The coil 27a of normally closed sensitive relay 27 is connected across zener diode 25. In addition, the normally closed contacts 27b of relay 27 are connected across solid state relay 18.

Resistors 12 and 13 are connected across secondary winding 4 to provide the ionizer and cell voltages as described hereinbefore. It will be observed that in this particular embodiment, cell current sensor 11 is not present, the lower end of resistor 12 being connected directly to the lower end of secondary winding 4 to form node 28 which determines the neutral connection for the ionizer and cell voltages.

Current overload sensor 9 is connected across tertiary winding 5, as described heretofore. One end of tertiary winding 5 is connected to ground 29 which provides a common return for the current overload sensor. It will be observed that ground 29, return 28, and the common return associated with primary winding 3 are electrically isolated. However, return 28 and ground 29 may be connected without affecting operation of the circuit. A capacitor 30 and diode 31 are connected across tertiary winding 5, with the anode of diode 31 connected to ground. A suitable indicator, such as incandescent indicator lamp 32, is connected across tertiary winding 5 to provide a visual indication of the overload status of the current overload sensor 9. The anode of diode 33 is connected to the cathode of diode 31. The cathode of diode 33 is connected to the anode of light emitting element 34, which in turn is connected to ground. A capacitor 35 is connected across light emitting element 34. Light emitting element 34 is optically coupled to light sensitive resistor 36, which is connected between the free end of light emitting element 21 and input voltage terminal 8. Light emitting element 34 and light sensitive resistor 36 may comprise an optical coupler, such as that manufactured by the Clairex Corp. under Part No. CLM8000.

In operation, power is initially applied to the power supply by closing switch 17. Since relay 27 is normally closed, a conductive path is provided through normally closed contacts 27b and primary winding 3 of the transformer. In addition, capacitor 26 begins charging through diode 23 and resistor 24 toward the breakdown voltage of zener diode 25. A voltage is also induced in secondary winding 4 to provide the ionizer and cell voltages. Likewise, a proportional voltage is induced in tertiary winding 5 which illuminates indicator lamp 32 to provide a visual indication that the power supply is operational. In addition, the alternating voltage induced in tertiary winding 5 is coupled through capacitor 30, clipped by diode 31, and supplied through diode 33 to capacitor 35 to activate light emitting element 34 and substantially reduce the resistance of light sensitive resistor 36.

As a result of the charging voltage appearing on capacitor 26, a current is supplied through sensitivity adjust resistor 22, light emitting element 21 and light sensitive resistor 36, which causes light emitting element 21 to illuminate light sensitive resistor 20 to turn on triac 19 of solid state relay 18. This provides a parallel conductive path for current to flow through primary winding 3. When the voltage on capacitor 26 has reached a level sufficient to supply the necessary pull-in current to coil 27a of sensitive relay 27, this relay will become activated, disengaging the normally closed contact 27b and thereby opening this current conducting path through primary winding 3 of transformer 2. It will thus be observed that relay 27 provides a conductive path through primary winding 3 to supply the necessary feedback current through line 10 from light sensitive resistor 36 until solid state relay 18 has been activated.

During normal operation, the voltage level appearing at tertiary winding 5 will be of such a magnitude that sufficient current will be supplied through light emitting element 34 to maintain light sensitive resistor 36 at a sufficiently low resistance value to maintain solid state relay 18 in conduction. However, in the event that overload current is required from transformer 2, as described hereinbefore, the voltage output of the transformer, and in particular the voltage output of tertiary winding 5, will diminish, thereby producing a decrease in the current available for light emitting element 34, a corresponding increase in the resistance of light sensitive resistor 36, and a corresponding decrease in the current supplied to solid state relay 18. Under this condition, when the current available to solid state relay has dropped below a predetermined threshold level as determined by the value of sensitivity resistor 22, there will be insufficient current supplied to solid state relay 18 to maintain it in conduction, and this relay will open, interrupting current flow through primary winding 3 of transformer 2.

To reestablish current flow in the transformer when the overload current causing condition has been eliminated, it is only necessary to momentarily open switch 17, thereby enabling capacitor 26 to discharge through relay coil 27a. When switch 17 is again closed, the normally closed contact 27b of relay 27 will permit current flow through primary winding 3 of transformer 2, thereby producing the necessary output voltage at tertiary winding 5. If the overload current condition has not been corrected, there will be insufficient voltage at tertiary winding 5 to supply the necessary current through light emitting element 34, light sensitive resistor 36 and light emitting element 21 to maintain solid state relay 18 in conduction. Under this condition, solid state relay 18 will not be maintained in conduction when sensitive relay 27 is deactivated, and the power supply will be deenergized. The absence of an indication from indicator lamp 32 will notify the operator that an overload condition has occurred and that the electrostatic precipitator should be cleared of the shorted condition and the power supply reset.

In some applications, it may not be desirable to inhibit power supply operation each time the current increases momentarily beyond the overload value as a result of an intermittent arcing condition. The embodiment of FIG. 3 includes a time delay feature formed by diode 33 and capacitor 35, which delays opening switch 18 for a short period of time. Under normal operating conditions, the current supplied by tertiary winding 5 is sufficient to charge capacitor 35 as well as provide sufficient luminous output from light emitting element 34 to maintain light sensitive resistor 36 in a high conductance state. However, if an overload current condition occurs, the reduced voltage output of winding 5 will be insufficient to supply sufficient charging current to capacitor 35 which will begin to discharge through light emitting element 34. Depending upon the time constant of capacitor 35 and the resistance presented by light emitting element 34, which may be predetermined, light sensitive resistor will maintain its high conductance state for several seconds, thereby preventing inhibiting of power supply operation by intermittent current overload caused by arcing conditions of short duration. However, if the current overload condition is sustained for a period of time sufficient to cause capacitor 35 to discharge through light emitting element 34, light sensitivity resistor 36 will be returned to a high resistance value to open switch 18, as described hereinabove.

FIG. 4 illustrates a second embodiment of the overload protection circuit of the present invention, wherein the circuitry is identical to that illustrated in FIG. 3, with the exception of the components comprising current overload sensor 9 and cell current sensor 11. In this embodiment, one end of tertiary winding 5 is connected to ground 29, while the other end of tertiary winding 5 is connected to the parallel combination of an indicator lamp 37, resistor 38, and light emitting element 39. Light emitting element 39 is optically coupled to light sensitive resistor 40, in a manner similar to that described in connection with the embodiment of FIG. 3. The other end of the parallel connection of indicator lamp 37, resistor 38 and light emitting element 39 is connected to the anode of SCR 41 which, in association with resistor 42, forms the cell current sensor 11. Resistor 42 is connected between resistor 12 and return 28 to form the node 43. Node 43 is connected to the gate electrode of SCR 41. The cathode of SCR 41 is connected to ground 29.

The operation of the embodiment of FIG. 4 is substantially the same as that described before in connection with the embodiments of FIG. 3. When switch 17 is closed, an initial current path is supplied to primary winding 3 through normally closed contact 27b in relay 27, inducing a voltage in tertiary winding 5. In addition, a voltage is induced in secondary winding 4, which produces a voltage across resistor 42 to energize SCR 41. This provides a conductive path through SCR 41 which illuminates lamp 37, and activates light emitting element 39. The optical coupling between light emitting element 39 and light sensitive resistor 40 produces a decrease in the resistance of resistor 40 to provide sufficient current to light emitting element 21 to energize solid state relay 18. As before, in the event that the voltage induced in tertiary winding 5 should decrease as a result of overload current being drawn from transformer 2, the current supplied to light element 39 and the amount of light coupled to light sensitive resistor 40 will decrease, causing an increase in the resistance of light sensitive resistor 40 which will produce a corresponding decrease in the current available to light emitting element 21. When the value of current supplied to light emitting element 21 decreases below a predetermined threshold, as determined by the sensitivity adjust resistor 22, solid state relay 18 will be deactivated, inhibiting further current flow through primary winding 3. The circuit may be reset when the overload current causing condition has been corrected as described hereinbefore.

In addition to the current overload sensor 9, the embodiment of FIG. 4 includes a cell current sensor comprising SCR 41 and sensing resistor 42. In normal operation, sufficient current will be supplied through the resistor divider formed by resistors 13, 12 and 42 to produce a voltage level at node 43 and the gate electrode of SCR 41 to maintain SCR 41 in conduction. However, if excessive current is required by the collecting cell, as might occur during an arcing or short circuit condition, the voltage drop across resistor 13 will increase, causing a corresponding decrease in the voltage at node 43. When the voltage at 43 drops below the threshold level necessary to trigger SCR 41, SCR 41 will be deactivated, thereby opening the conduction path through light emitting element 39. With light emitting element 39 extinguished, the resistance associated with light sensitive resistor 40 will increase substantially, thereby decreasing the current available to light emitting element 21 and deactivating solid state relay 18. In addition, the conduction path through indicator lamp 37 will be interrupted, thereby causing the indicator to extinguish and provide a visual indication that an overload condition has occurred. Cell current sensor 11 may be reset in a manner similar to that described hereinafter for current overload sensor 9. The embodiment of FIG. 4 may also be provided with a time delay feature similar to that described for the embodiment of FIG. 3.

A third embodiment of the overload current protection circuit of the present invention is illustrated in the circuit of FIG. 5. For purposes of an exemplary showing, switch 6 illustrated in FIG. 5 utilizes a different arrangement than that described hereinbefore in connection with the embodiments of FIG. 3 and FIG. 4. It will be understood, however, that the switch 6 of FIG. 3 and FIG. 4 may be utilized in the embodiment of FIG. 5 with the necessary peripheral circuit changes.

In the embodiment of FIG. 5, input voltage is provided to the circuit via terminals 7 and 8 and switch 17, as described hereinbefore. A solid state relay 44 is connected in series with primary winding 3 to control current flow therethrough in a manner similar to that described hereinbefore in connection with solid state relay 18. It will be understood by one skilled in the art that solid state relay 44 may be replaced by solid state relay 18 with the appropriate circuit changes. Solid state relay 44 comprises a full wave bridge rectifier 45. The input to bridge rectifier 45 is formed by a junction of the anode of diode 45a and the cathode of diode 45b. The cathode of diode 45a is connected to the cathode of the diode 45c to form node 46. The anode of diode 45b is connected to the anode of diode 45d to form node 47. The output of bridge rectifier 45 is formed by a junction of the anode of diode 45c and the cathode of diode 45d. The output of bridge rectifier 45 is connected in turn to primary winding 3.

Node 47 of bridge rectifier 45 is connected to the cathode of SCR 48, while the anode of SCR 48 is connected to node 46 of bridge rectifier 45. A resistor 49 is connected between the cathode and the gate electrode of SCR 48. Another resistor 50 is connected in series with light sensitive resistor 51 between the anode and the gate electrodes of SCR 48.

The series combination of diode 52, resistors 53, and zener diode 54 is connected between the input to switch 44 and terminal 8, with the anode of diode 52 connected to the input of solid state relay 44 and the anode of zener diode 54 connected to terminal 8. A resistor 55 and capacitor 56 are connected in parallel with the zener diode 54. A capacitor 57 is connected between the cathode of zener diode 54 and the cathode of diode 58. The anode of diode 58 is connected to the terminal 8. A resistor 59 and light emitting element 60 are connected in parallel across diode 58. Light emitting element 60 is optically coupled to light sensitive resistor 51.

The circuitry associated with secondary winding 4 is substantially the same as that described hereinbefore in connection with the embodiments of FIG. 3 and FIG. 4 and need not be repeated.

As described hereinbefore, one end of tertiary winding 5 is connected to ground 29. The other end of winding 5 is connected to the juncture of indicator 61 and the anode of a diode 62. The cathode of diode 62 is connected to the juncture of a capacitor 63, resistor 64 and light emitting element 65. A resistor 66 in series with light emitting element 65 may be used to control the sensitivity of the current overload sensor 9, in a manner similar to that described hereinbefore for resistor 22 in the embodiments of FIG. 3 and FIG. 4. The free ends of indicator 61, capacitor 63, resistor 64, and resistor 66 are connected to the anode of SCR 41. A light sensitive resistor 67 is optically coupled to light emitting element 65 and is connected in parallel across light sensitive resistor 51.

In operation, when switch 17 is initially closed, current is supplied through diode 52 and resistor 53 to charge capacitor 56. In addition, a positive pulse of current is coupled through capacitor 57 to activate light emitting element 60 which substantially reduces the resistance of light sensitive resistor 51. At the same time, current is conducted through the path formed by diode 45a, resistor 50, light sensitive resistor 51, resistor 49, diode 45d and primary winding 3 to produce a voltage drop across resistor 49 and activate SCR 48. This permits the current required by the power supply to be supplied to primary winding 3 by means of the conduction path formed by diode 45a, SCR 48 and diode 45d.

The conduction of current through primary winding 3 causes a voltage to be induced in tertiary winding 5, thereby causing a current to flow through diode 62, light emitting element 65 and resistor 66 to substantially reduce the resistance of light sensitive resistor 67. The small resistance presented by light sensitive resistor 67 permits sufficient current to flow through resistor 49 to maintain the SCR 48 in the conducting state. Meanwhile, the voltage pulse present at the cathode of diode 58 has dissipated, deenergizing light emitting element 60 and permitting light sensitive resistor 51 to return to a high resistance value. As long as tertiary winding 5 continues to produce sufficient voltage, SCR 48 will be maintained in conduction to provide current through primary winding 3. It will thus be observed that the combination of elements 51–60 operate to permit current flow through primary winding 3 until the feedback path formed by elements 61–67 can be activated.

In the event that overload current should be drawn from transformer 2, the voltage induced in tertiary winding 5 will decrease, as described hereinbefore, thereby producing less current flow through light emitting element 65 and causing light sensitive resistor 67 to exhibit a higher value of resistance. When the value of resistance associated with light sensitive resistor 67 reaches a value such that the current flow through resistor 49 is insufficient to maintain SCR 48 in conduction, the SCR will be deenergized, inhibiting current flow through the full wave bridge rectifier 45 and primary winding 3. The threshold level necessary to cause deenergization of SCR 48 can be controlled by proper choice of sensitivity adjust resistor 66.

The operation of cell current sensor 11 is identical to that described hereinbefore in connection with the embodiment of FIG. 3 and FIG. 4 and need not be repeated. The circuit embodiment of FIG. 5 may be reset in a manner similar to that described hereinbefore. Diode 62 and capacitor 63 provide a time delay feature similar to that described hereinbefore for the embodiment of FIG. 3.

It will be understood that various changes in the details, materials and steps and arrangements of parts, which have been herein described and illustrated in order to explain the nature of the invention, may be made by those skilled in the art within the principle and scope of the invention as expressed in the appended claims.

The embodiments of the invention in which an exclusive property or privilege is claimed are defined as follows:

1. In an electrostatic precipitator power supply of the type having a ferroresonant transformer including a primary winding and a secondary winding, said primary winding configured to be coupled to a source of power, said secondary winding adapted to supply high voltage to an ionizer and collecting cell in the precipitator, an automatic current overload protection circuit comprising:
    a. switch means in series with the primary winding of the transformer for allowing current flow therethrough from the source of power when said switch means is activated under normal operating conditions and inhibiting current flow therethrough when said switch is deactivated during an overload current condition;
    b. a tertiary winding in association with the transformer, said tertiary winding developing an output voltage which decreases as the current supplied by said transformer increases; and
    c. sensing means connected to said tertiary winding for deactivating said switch means to inhibit current flow through the primary winding of the transformer when said output voltage developed by said tertiary winding is less than or equal to a predetermined voltage threshold level.

2. The circuit of claim 1 including indicating means in association with said sensing means for providing a visual indication when the current flow through the primary winding of the transformer is inhibited.

3. The circuit according to claim 1 including resistor divider means in association with the secondary winding of the transformer for supplying high voltages to the ionizer and collecting cell.

4. The circuit of claim 3 including means in association with said sensing means and said resistor divider means for deactivating said switch means to inhibit current flow through the primary winding of the transformer when the voltage across said resistor divider means falls below a predetermined threshold value.

5. The circuit according to claim 4 wherein said means in association with said sensing means comprises switching means connected in series with said sensing means and a point of ground potential.

6. The circuit according to claim 1 wherein said sensing means is electrically isolated from said switch means.

7. The circuit according to claim 1 wherein said sensing means includes means for converting said output voltage to a D.C. current for deactivating said switch means.

8. The circuit according to claim 1 including means for applying power to said switch means and wherein said sensing means operates said switch means to allow current flow therethrough for a short period following the application of power to said switch, and means for operating said switch means after said sensing means has ceased operating said switch means.

9. The circuit according to claim 1 wherein said sensing means includes time delay means for deactivating said switch means to inhibit current flow through the primary winding of the transformer only when said output voltage is less than or equal to said predetermined voltage threshold level for a period of time longer than a predetermined time interval.

* * * * *